United States Patent Office 2,775,574
Patented Dec. 25, 1956

2,775,574

ACRYLONITRILE COPOLYMERS STABILIZED WITH CINNAMIC ACID AND ITS SALTS

Robert J. Slocombe, Dayton, and George L. Wesp, Englewood, Ohio, assignors to Monsanto Chemical Company, St. Louis, Mo., a corporation of Delaware No Drawing. Application April 27, 1953,
Serial No. 351,468

10 Claims. (Cl. 260—45.85)

This invention relates to methods of preparing polymers of acrylonitrile which are stabilized with respect to thermo-discoloration. More specifically the invention relates to methods of converting unstable polymers of acrylonitrile into color-stable polymers.

Although polyacrylonitrile and copolymers of 50% or more by weight of acrylonitrile and other monomers containing olefinic unsaturation copolymerized therewith are generally regarded as being materials of good thermo-stability, they are subject to discoloration. This phenomenon generally results because of the necessity for extruding and molding the composition at elevated temperatures. Furthermore, the higher acrylonitrile polymers find extensive use in the fabrication of fibers, films and fabrics which frequently are subjected to ironing operations at elevated temperatures. Thus, serious discolorations are often developed in the fabrication and processing of acrylonitrile polymers.

The primary purpose of this invention is to provide color-stable polymers of acrylonitrile. A further purpose of the invention is to facilitate molding and other processing procedures without the danger usually encountered at elevated temperatures, resulting in the deterioration of fibers and other forms of acrylonitrile polymers. A still further purpose of the invention is to provide substances which can be added to conventional polymers to induce resistance to heat discoloration.

It has been discovered that by adding certain compounds containing the cinnamate radical to acrylonitrile polymers improved resistance to discoloration may readily be developed. The nature of the chemical reaction involved is not definitely understood, but it is believed that the color change is due to some impurities present in the polymer. It may be that the cinnamate radicals alone or in combination with specific metal ions react with the impurity to form a substance which contributes to less thermal discoloration than the impurity in its original form. Since not all cinnamic acid derivatives produce the same degree of beneficial effect the phenomena may involve additional stabilization by the metal as well as the acid portion of the compound. The total stabilization may involve additive or synergistic effects.

Compounds which are particularly useful for this purpose include cinnamic acid, cinnamic anhydride, and esters of cinnamic acid in which the alcohol radical has from 2 to 12 carbon atoms. The alcohol portion of the ester may include radicals which are single-ringed cycloaliphatic and aromatic moieties, such as ethyl cinnamate, propyl cinnamate, butyl cinnamate, butyl tin cinnamate, octyl cinnamate, dodecyl cinnamate, phenyl cinnamate and cyclohexylcinnamate. Other cinnamate compounds which may be employed include magnesium, calcium, aluminum and strontium cinnamates.

The acrylonitrile polymers with which this invention may be practiced include polyacrylonitrile and copolymers of from 20 or more percent acrylonitrile and up to 80% of one or more of a wide variety of other unsaturated substances known to be copolymerizable with the acrylonitrile. Thus, the invention is practicable with the well-known fiber-forming copolymers of acrylonitrile which may be the copolymers of 75% or more of acrylonitrile and up to 25% of other monomers. Other copolymers of from 25% to 75% acrylonitrile and 75% to 25% of various other monomers, which copolymers have primary utility in the field of film and molding composition production are also useful.

The said other monomers with which the acrylonitrile may be copolymerized to produce resinous substances capable of use in the practice of this invention include vinyl acetate and other vinyl esters of monocarboxylic acids having up to 4 carbon atoms in the carboxylic acid radical, dimethyl maleate and dimethyl fumarate and other alkyl esters of fumaric and maleic acids wherein the alkyl radical has up to 4 carbon atoms, methyl methacrylate or acrylate and other alkyl acrylates and alkyl methacrylates wherein the alkyl radical has up to 4 carbon atoms, vinyl chloride and other vinyl halides, styrene, alpha-methylstyrene, and other vinyl and isopropenyl-substituted aromatic hydrocarbons, methacrylonitrile, vinylidene chloride, vinyl-pyridine, and vinyl derivatives of other alkyl-substituted pyridines and the vinyl derivatives of other compounds containing a tertiary amino atom in a heterocyclic ring, vinyl chloroacetate and vinyl esters of halo acetic acids, methallyl chloroacetate, allyl chloroacetate and chloroallylchloroacetate, and the corresponding esters of other haloacetic esters, vinyl-imidazole and other N-vinyl derivatives of heterocyclic nitrogen compounds, and one or more of these and other unsaturated compounds known to be copolymerizable with acrylonitrile.

In the practice of this invention the stabilizer may be used to the extent of 0.01% to 10% by weight of the acrylonitrile polymer to be stabilized. Preferred practice of this invention involves the use of 0.1% to 3% of the stabilizer.

The invention may be practiced by combining the acrylonitrile polymer and the cinnamic acid or derivative thereof by a wide variety of mechanical procedures. Thus, the polymer may be treated in granular solid form and mixed physically with the compound or in aqueous or liquid solution or dispersion of the compound. The physical mixture may take place at room temperature or at higher temperatures, for example, the temperature at which the polymer is semi-solid. A preferred practice involves the use of solvents or plasticizers for the acrylonitrile polymers in the presence of which the intimate dispersing of the stabilizing additive and the acrylonitrile polymer is more readily effected. The nature of the solvent which is useful in dissolving or softening the acrylonitrile polymer will, to a large extent, depend upon the chemical composition of the acrylonitrile polymers.

The copolymers of 75% or more of acrylonitrile and up to 25% of the comonomer are well-known fiber-forming compositions and are generally resistant to the effect of most chemical solvents. In the preparation of solutions of such copolymers, solvents such as N,N-dimethylformamide, N-dimethylacetamide, gamma-butyrolactone, ethylene carbonate, alpha-cyanoacetamide, and tris(dimethylamido) phosphate may be used.

In the treatment of the more soluble types of acrylonitrile polymers, for example, those of from 20% to 75% acrylonitrile and from 25% to 80% of other monomers copolymerizable therewith, the selection of a solvent is less critical. This type of copolymer may be dissolved by the various ketones, esters and aromatic hydrocarbon types of solvents. In general, the copolymer is placed in a suitable solution or softened and swelled by the selected medium so as to enable a more ready dispersion of the cinnamic ester or salt within the solid polymer. Obviously, a solvent which is also capable of dissolving, at least to some extent the cinnamic ester or salt to be used, will be exceptionally beneficial. However, the selection of the dispersing agent, the stabilizing agent and the particular method of dispersing the compounds in the solid polymer is a matter readily determined by one skilled in the art.

To evaluate the stabilizing action of various compounds, acrylonitrile polymers of different chemical and physical properties were used and the compound dispersed therein by a variety of methods.

*Example*

Ten parts of polyacrylonitrile was stabilized by suspending the powdered polymer in an aqueous solution containing one part of magnesium cinnamate. The suspension was heated over a steam bath to drive off the water. A similar sample of ten parts of polyacrylonitrile was also prepared without a stabilizer for comparison testing. The two samples were then heated in glass tubes for ten minutes in a high temperature bath at 225–230° C. It was found that the high temperature heating caused the untreated sample to change from the initial white condition to a dark brown color, whereas the treated sample remained white with only slight yellowing. It was also found that the treated sample after heating dissolved readily and completely in dimethylformamide to give a colorless solution, while the untreated sample dissolved only partially, even when the solution was heated to 95° C. The polymer solution in this case was an orange-brown color, while the undissolvable deterioration products from the untreated polymer consisted of deep brown, insoluble gel particles.

What we claim is:

1. A stable acrylonitrile polymer comprising solid a polymer of 20% to 100% of acrylonitrile and up to 80% of another monoolefinic monomer copolymerized therewith, said polymer containing intimately dispersed therein from 0.01% to 10% of a compound of the group consisting of:

Cinnamic acid
Cinnamic anhydride esters of cinnamic acid and a monohydric, non-heterocyclic alcohol having from 2 to 12 carbon atoms in the alcohol radical;

Magnesium cinnamate
Calcium cinnamate
Aluminum cinnamate, and
Strontium cinnamate.

2. A stable acrylonitrile polymer comprising solid a polymer of 20% to 100% of acrylonitrile and up to 80% of another monoolefinic monomer copolymerized therewith, said polymer containing intimately dispersed therein from 0.01% to 3% of a compound of the group consisting of:

Cinnamic acid
Cinnamic anhydride esters of cinnamic acid and a monohydric, non-heterocyclic alcohol having from 2 to 12 carbon atoms in the alcohol radical;

Magnesium cinnamate
Calcium cinnamate
Aluminum cinnamate,
Strontium cinnamate.

3. A stable acrylonitrile polymer comprising solid a polymer of 20% to 100% of acrylonitrile and up to 80% of another monoolefinic monomer copolymerized therewith, said polymer containing intimately dispersed therein from 0.01% to 10% of magnesium cinnamate.

4. A stable acrylonitrile polymer comprising solid a polymer of 20% to 100% of acrylonitrile and up to 80% of another monoolefinic monomer copolymerized therewith, said polymer containing intimately dispersed therein from 0.01% to 3% of magnesium cinnamate.

5. A stable acrylonitrile polymer comprising a solid polymer of 20% to 100% of acrylonitrile and up to 80% of another mono-olefinic monomer copolymerized therewith, said polymer containing intimately dispersed therein from 0.01% to 10% of calcium cinnamate.

6. A stable acrylonitrile polymer comprising a solid polymer of 20% to 100% of acrylonitrile and up to 80% of another mono-olefinic monomer copolymerized therewith, said polymer containing intimately dispersed therein from 0.01% to 3% of magnesium cinnamate.

7. A stable acrylonitrile polymer comprising a solid polymer of 20% to 100% of acrylonitrile and up to 80% of another mono-olefinic monomer copolymerized therewith, said polymer containing intimately dispersed therein from 0.01% to 10% of aluminum cinnamate.

8. A stable acrylonitrile polymer comprising a solid polymer of 20% to 100% of acrylonitrile and up to 80% of another mono-olefinic monomer copolymerized therewith, said polymer containing intimately dispersed therein from 0.01% to 3% of aluminum cinnamate.

9. A stable acrylonitrile polymer comprising a solid polymer of 20% to 100% of acrylonitrile and up to 80% of another mono-olefinic monomer copolymerized therewith, said polymer containing intimately dispersed therein from 0.01% to 10% of strontium cinnamate.

10. A stable acrylonitrile polymer comprising a solid polymer of 20% to 100% of acrylonitrile and up to 80% of another mono-olefinic monomer copolymerized therewith, said polymer containing intimately dispersed therein from 0.01% to 3% of strontium cinnamate.

References Cited in the file of this patent

UNITED STATES PATENTS 2,614,090   Averill _____ Oct. 14, 1952